US009520969B2

(12) United States Patent
Iwamura et al.

(10) Patent No.: US 9,520,969 B2
(45) Date of Patent: Dec. 13, 2016

(54) MOBILE COMMUNICATION SYSTEM, RADIO BASE STATION, AND MOBILE STATION

(75) Inventors: Mikio Iwamura, Tokyo (JP); Anil Umesh, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 13/521,074

(22) PCT Filed: Jan. 7, 2011

(86) PCT No.: PCT/JP2011/050216
§ 371 (c)(1),
(2), (4) Date: Sep. 12, 2012

(87) PCT Pub. No.: WO2011/083865
PCT Pub. Date: Jul. 14, 2011

(65) Prior Publication Data
US 2012/0327924 A1 Dec. 27, 2012

(30) Foreign Application Priority Data

Jan. 8, 2010 (JP) ................................ P2010-003378

(51) Int. Cl.
*H04L 5/00* (2006.01)
*H04W 56/00* (2009.01)
*H04W 72/00* (2009.01)

(52) U.S. Cl.
CPC .......... *H04L 5/001* (2013.01); *H04W 56/0045* (2013.01); *H04W 72/00* (2013.01)

(58) Field of Classification Search
CPC .......... H04L 5/00; H04L 27/00; H04W 72/00; H04W 56/00
(Continued)

(56) References Cited

U.S. PATENT DOCUMENTS 8,089,921 B2 * 1/2012 Yamada ............ H04W 56/0005
370/328
8,831,615 B2 * 9/2014 Wei ........................ H04W 36/30
455/437
(Continued)

FOREIGN PATENT DOCUMENTS

EP 2124488 A1 11/2009

OTHER PUBLICATIONS

Office Action for Japanese Patent Application No. 2011-549041 mailed Oct. 9, 2012, with English translation thereof (5 pages).
(Continued)

*Primary Examiner* — Andrew Lai
*Assistant Examiner* — Sumitra Ganguly
(74) *Attorney, Agent, or Firm* — Osha Liang LLP

(57) ABSTRACT

The present invention is a mobile communication system having a mobile station UE, in which CA is performed, configured to transmit an uplink data signal to a radio base station eNB, by using a plurality of "Component Carriers" having different carrier frequencies, and the mobile communication system includes TA timer management units 13 and 23 configured to manage the TA timer corresponding to the plurality of "Component Carriers"; and state management units 14 and 24 configured to manage the state of the plurality of "Component Carriers", and the state management units 14 and 24 are configured to set the state of a "Component Carrier", whose TA timer has expired, to an asynchronous state.

2 Claims, 4 Drawing Sheets

(58) Field of Classification Search
USPC ........ 370/343, 329, 328; 455/436, 434, 515
See application file for complete search history.

(56) References Cited

U.S. PATENT DOCUMENTS

| | | | |
|---|---|---|---|
| 2009/0046641 A1* | 2/2009 | Wang | H04W 74/002 370/329 |
| 2009/0092091 A1 | 4/2009 | Balasubramanian | |
| 2009/0316630 A1 | 12/2009 | Yamada et al. | |
| 2010/0222060 A1* | 9/2010 | Zhang | H04W 36/30 455/436 |
| 2010/0222071 A1* | 9/2010 | Tafreshi | H04W 28/08 455/453 |
| 2010/0227569 A1* | 9/2010 | Bala | H04L 5/0007 455/73 |
| 2010/0279695 A1* | 11/2010 | Amirijoo | H04W 36/0055 455/438 |
| 2011/0002281 A1* | 1/2011 | Terry | H04W 52/0216 370/329 |
| 2011/0105050 A1* | 5/2011 | Khandekar | H04L 5/001 455/68 |
| 2012/0115468 A1* | 5/2012 | Lindoff | H04W 36/06 455/434 |

OTHER PUBLICATIONS

3GPP TSG-RAN WG2 Meeting #68, R2-096582; "RACH Procedures for Carrier Aggregation," InterDigital, Jeju, Korea, Nov. 9-13, 2009 (3 pages).
3GPP TS 36.331 v8.7.0, 3rd Generation Partnership Project; Technical Specification Group Radio Access Network; Evolved Universal Terrestrial Radio Access (E-UTRA) Radio Resource Control (RRC); Protocol specification (Release 8) (Sep. 2009) (4 pages).
CATT, "Consideration on RACH procedure and RLF," 3GPP TSG RAN WG2 Meeting #68, R2-096506, Nov. 9, 2009 (2 pages).
ZTE, "Radio link failure trigger in a carrier aggregation," 3GPP TSG RAN WG2 #67, R2-094705, Aug. 24, 2009 (2 pages).
3GPP TS 36.321 V9.1.0, Dec. 2009, "3rd Generation Partnership Project; Technical Specification Group Radio Access Network; Evolved Universal Terrestrial Radio Access (E-UTRA); Medium Access Control (MAC) protocol specification (Release 9)," p. 17 (2 pages).
Nokia Corp., et al., "RACH and carrier aggregation," 3GPP TSG-RAN WG2 Meeting #68, R2-096844, Nov. 9, 2009 (3 pages).
Nokia Siemens Networks, et al., "Timing advance for carrier aggregation in LTE-A," 3GPP TSG RAN WG1 Meeting #59, R1-094637, Nov. 9, 2009 (2 pages).
Alcatel-Lucent et al., "Relevance of carrier aggregation scenarios with impact on timing advance (ref. R1-094425)," 3GPP TSG-RAN WG1 #59, R1-094597, Nov. 9, 2009 (2 pages).
Huawei, "Issues in carrier aggregation," 3GPP TSG RAN WG1 Meeting #57bis, R1-092377, Jun. 29, 2009 (6 pages).
NTT Docomo, Inc., et al., "Multiple Ta for Ca," 3GPP TSG-RAN2 #69, R2-101530, Feb. 22, 2010 (2 pages).
3GPP TR 36.814 V1.5.0, Nov. 2009, "3rd Generation Partnership Project; Technical Specification Group Radio Access Network; Further Advancements for E-UTRA; Physical Layer Aspects (Release 9)" (53 pages).
3GPP TS 36.321 V9.1.0, Dec. 2009, "3rd Generation Partnership Project; Technical Specification Group Radio Access Network; Evolved Universal Terrestrial Radio Access (E-UTRA); Medium Access Control (MAC) protocol specification (Release 9)" (48 pages).
International Search Report issued in PCT/JP2011/050216, mailed on Feb. 1, 2011, with translation (4 pages).
Office Action in counterpart Korean Patent Application No. 10-2012-7017891 dated Jan. 10, 2014 (5 pages).
Office Action in counterpart Chinese Patent Application No. 201180005634.0 issued Aug. 22, 2014 (11 pages).
Office Action in counterpart Chinese Patent Application No. 201180005634.0 issued Apr. 22, 2015 (11 pages).
Office Action issued in the counterpart European Patent Application No. 11731863.4, mailed Jul. 25, 2016 (8 pages).

\* cited by examiner

MOBILE COMMUNICATION SYSTEM, RADIO BASE STATION, AND MOBILE STATION

TECHNICAL FIELD

The present invention relates to a mobile communication system, a radio base station, and a mobile station.

BACKGROUND ART

In the LTE (Long Term Evolution)—Advanced scheme for which the 3GPP is developing standardization, "CA (Carrier Aggregation)" is under examination.

When the CA is performed in a mobile station UE, the mobile station UE is configured to transmit an uplink signal by using a plurality of "Component Carriers (CCs)" of different frequency bands, to a radio base station eNB.

CITATION LIST

Non Patent Literature

[NPL 1] 3GPP TR36.814 v1.5.0
[NPL 2] 3GPP TS36.321 v9.1.0

However, a problem was that as shown in FIG. 1, when CA is performed in a mobile station UE by using "Component Carriers (for example, CC #1 and CC #11)" in cells having a different coverage (for example, a cell #1 and a cell #11), and as shown in FIG. 2, when CA is performed in a mobile station UE by using a "Component Carrier (for example, CC #1)" in a cell #1 in which a repeater is not used, and a "Component Carrier (for example, CC #2)" in a cell #2 in which a repeater #2 is used, the reception timing of an uplink signal in the radio base station eNB varies immensely in each "Component Carrier".

SUMMARY OF THE INVENTION

Therefore, the present invention has been achieved in view of the above problem, and an object thereof is to provide a mobile communication system, a radio base station, and a mobile station by which the reception timing of an uplink signal in a radio base station eNB can be maintained within a constant range even when CA is performed.

A first characteristic of the present embodiment is summarized in that a mobile communication system having a mobile station configured to transmit an uplink signal to a radio base station by using a plurality of carriers having different carrier frequencies, comprising, a timer management unit configured to manage the timer corresponding to the plurality of carriers, and a state management unit configured to manage the state of the plurality of carriers, in which the state management unit is configured to set the state of a carrier, whose timer has expired, to an asynchronous state.

A second characteristic of the present embodiment is summarized in that a radio base station configured to receive an uplink signal from a mobile station by using a plurality of carriers having different carrier frequencies, comprising, a timer management unit configured to manage the timer corresponding to the plurality of carriers, and a state management unit configured to manage the state of the plurality of carriers, in which the state management unit is configured to set the state of a carrier, whose timer has expired, to an asynchronous state.

A third characteristic of the present embodiment is summarized in that a mobile station configured to transmit an uplink signal to a radio base station by using a plurality of carriers having different carrier frequencies, comprising, a timer management unit configured to manage the timer corresponding to the plurality of carriers, and a state management unit configured to manage the state of the plurality of carriers, in which the state management unit is configured to set the state of a carrier, whose timer has expired, to an asynchronous state.

As described above, according to the present invention, it is possible to provide a mobile communication system, a radio base station, and a mobile station by which the reception timing of an uplink signal in a radio base station eNB can be maintained within a constant range even when CA is performed.

DESCRIPTION OF EMBODIMENTS (Mobile Communication System According to First Embodiment of the Present Invention)

With reference to FIG. 1 to FIG. 4, the configuration of a mobile communication system according to a first embodiment of the present invention will be described.

The mobile communication system according to the present embodiment is a mobile communication system of the LTE-Advanced scheme, and is configured to enable CA by a mobile station UE.

Figure 1:
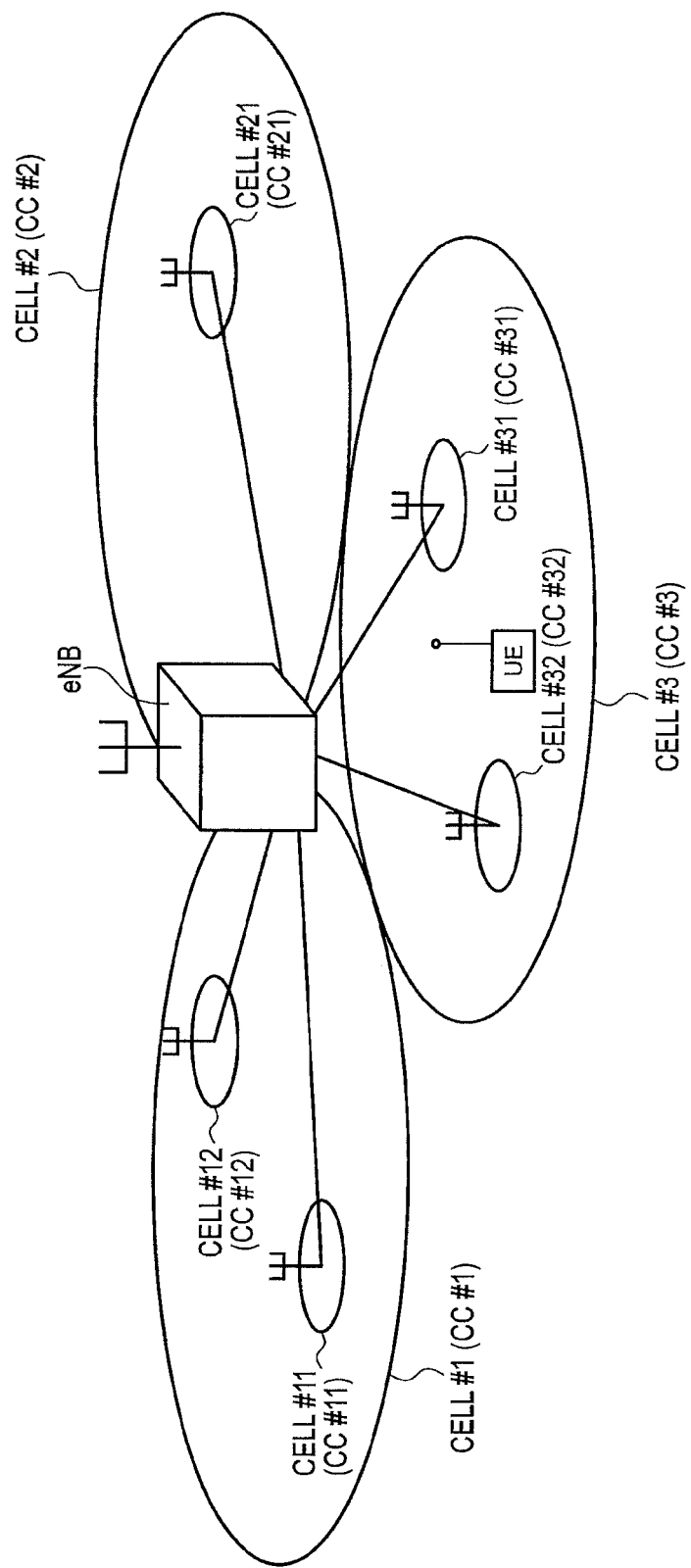
FIG. 1 is a diagram showing the entire configuration of a mobile communication system according to a first embodiment of the present invention.
Figure 2:
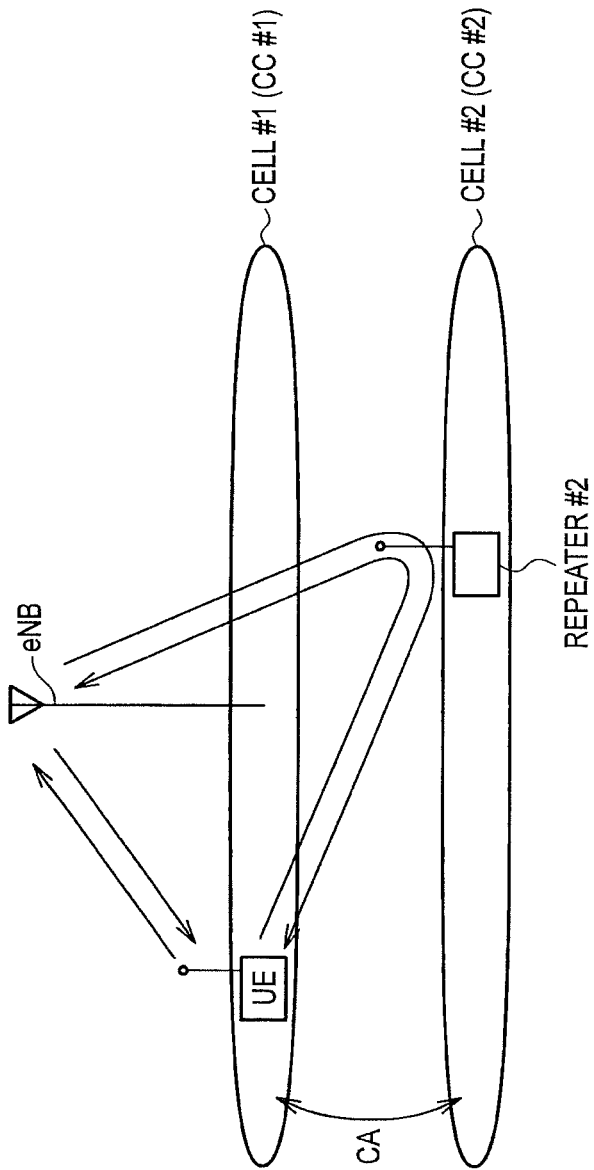
FIG. 2 is a diagram showing the entire configuration of the mobile communication system according to the first embodiment of the present invention.

For example, the mobile communication system according to the present embodiment may have a configuration as shown in FIG. 1, or a configuration as shown in FIG. 2, or any other configuration.

In the configuration shown in FIG. 1, a cell #1, a cell #2, and a cell #3 are provided as macro cells, and a cell #11, a cell #12, a cell #21, a cell #31, and a cell #32 are provided as flared cells subordinate to a radio base station eNB.

In this case, the cell #11 and the cell #12 are provided within the coverage of the cell #1, the cell #21 is provided within the coverage of the cell #2, and the cell #31 and the cell #32 are provided within the coverage of the cell #3.

Furthermore, CC (Component Carrier) #1 is used in the cell #1, CC #2 is used in the cell #2, CC #3 is used in the cell #3, CC #11 is used in the cell #11, CC #12 is used in the cell #12, CC #21 is used in the cell #21, CC #31 is used in the cell #31, and CC #32 is used in the cell #32.

For example, the CC #1, the CC#2, and the CC #3 are "Component Carriers" having a carrier frequency in the 2-GHz band, and the CC#11, the CC #12, the CC #21, the CC #31, and the CC #32 may be "Component Carriers" having a carrier frequency in the 3.5-GHz band.

For example, the bandwidth of the "Component Carriers" may be any one of 6 RB (Resource Blocks), 15 RB, 25 RB, 50 RB, 75 RB, or 100 RB. Note that 1 RB equals 180 kHz.

Furthermore, in the configuration illustrated in FIG. 2, a cell #1 and a cell #2 are provided as macro cells subordinate to the radio base station eNB. The CC #1 is used in the cell #1, and the CC #2 is used in the cell #2.

For example, both the CC #1 and the CC #2 may be "Component Carriers" having a carrier frequency in the 2-GHz band (or 3.5-GHz band). Alternatively, the CC #1 may be a "Component Carrier" having a carrier frequency in the 2-GHz band (or 3.5-GHz band), and the CC #2 may be a "Component Carrier" having a carrier frequency in the 3.5-GHz band (or 2-GHz band).

In this case, a repeater (that is, booster) is not installed in the cell #1, and a repeater #2 is installed in the cell #2.

Figure 3:
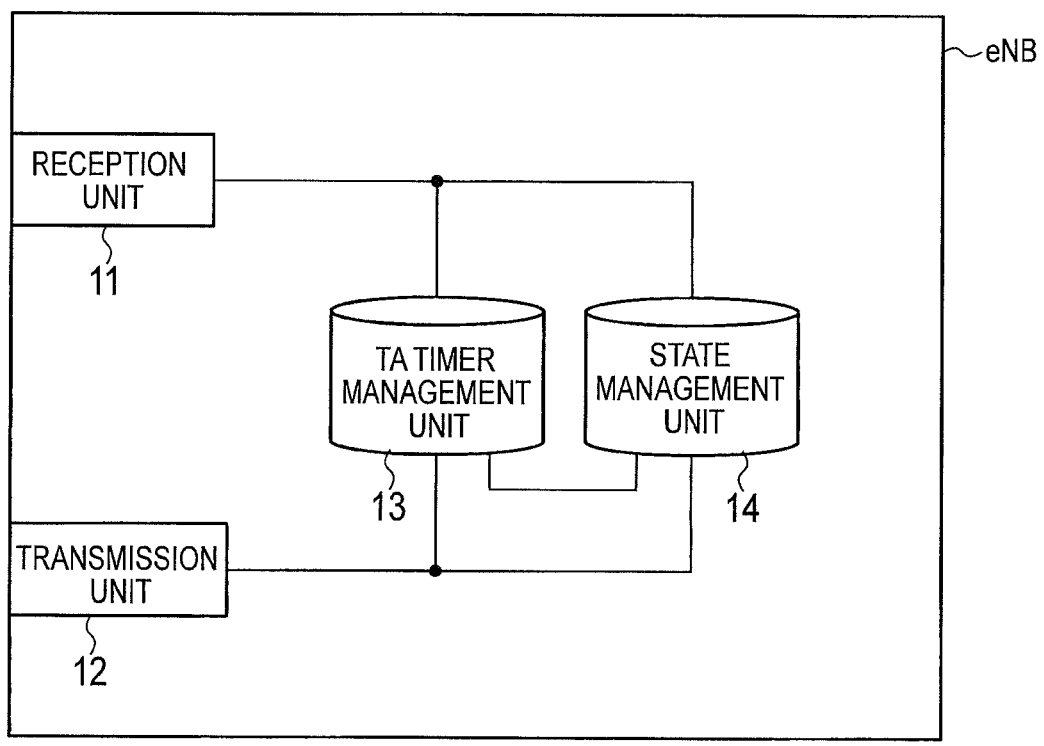
FIG. 3 is a functional block diagram of a radio base station according to the first embodiment of the present invention.

As illustrated in FIG. 3, the radio base station eNB includes a reception unit 11, a transmission unit 12, a TA timer management unit 13, and a state management unit 14.

The reception unit 11 is configured to receive an uplink data signal or an uplink control signal transmitted from a mobile station UE by using PUSCH (Physical Uplink Shared Channel) or PUCCH (Physical Uplink Control Channel) in a plurality of "Components Carriers" having different carrier frequencies.

The TA timer management unit 13 is configured to manage a TA (Timing Advance, transmission timing adjustment information) timer corresponding to each CC used in each mobile station UE in which CA is performed.

In this case, the TA timer management unit 13 is configured to start the TA timer corresponding to each CC, when each CC is in a synchronous state.

Alternatively, the TA timer management unit 13 is configured to start the TA timer corresponding to CC upon receiving the TA ("TA Command") corresponding to each CC from the radio base station eNB.

Furthermore, the TA timer management unit 13 is configured to assign and manage the TA that must be applied to each CC used in each mobile station UE in which CA is performed.

In this case, the TA timer management unit 13 may be configured to assign the same TA to a plurality of "Component Carriers" processed by the same receiver (IFFT: Inverse Fast Fourier Transform; inverse Fourier transformer) within each mobile station UE in which CA is performed.

That is, the TA timer management unit 13 may be configured to assign only a single TA to a mobile station UE in which only "contiguous CA" is performed. In this case, the "contiguous CA" is CA processed by a single receiver (IFFT).

In "Component Carriers" processed by the same receiver (IFFT), if separate TAs are used, the orthogonality among the OFDM subcarriers spanning the "Component Carriers" is no longer maintained, and therefore, the same TA must be used. Therefore, the above configuration is achieved.

On the other hand, the TA timer management unit 13 may be configured to assign different TAs to a plurality of "Component Carriers" processed by different receivers (IFFT) within each mobile station UE in which CA is performed.

That is, the TA timer management unit 13 is configured to independently assign TA to each of the plurality of "Component Carriers" for which a "non-contiguous CA" is to be performed, in a mobile station UE in which the "non-contiguous CA" is performed. In this case, the "non-contiguous CA" is CA processed by a plurality of receivers (IFFT).

Furthermore, the TA timer management unit 13 may be configured to assign different TAs to each group of "Component Carriers" specified by the radio base station eNB.

The state management unit 14 is configured to manage the state (synchronous state or asynchronous state) of each CC used in each mobile station UE in which CA is performed.

In this case, the state management unit 14 is configured to set the state of the "Component Carrier", whose TA timer has expired, to the asynchronous state.

The transmission unit 12 is configured to transmit a "UL grant" and a "Sync Request MAC (Media Access Control) CE (Control Element)" to the mobile station UE in which CA is performed, via PDCCH (Physical Downlink Control Channel) and PDSCH (Physical Downlink Shared Channel).

Furthermore, the transmission unit 12 is configured to transmit the TA assigned to each of the plurality of "Component Carriers", to the mobile station UE in which CA is performed.

Furthermore, the transmission unit 12 may be configured to transmit the aforementioned TA to the mobile station UE in which CA is performed, with the help of a "Timing Advance MAC CE".

The "Timing Advance MAC CE" specifies the value of the TA that must be applied, as well as the identifier of the "Component Carrier" or the group thereof to which the TA must be applied.

The transmission unit 12 may be configured to transmit the aforementioned TA to the mobile station UE in which CA is performed, via an "Anchor Carrier".

In this case, an Anchor Carrier may be defined as a carrier, from among a plurality of "Component Carriers", to which a PDCCH (Physical Downlink Control Channel) signal is transmitted, or a carrier to which a PHICH (Physical HARQ Indicator Channel) signal is transmitted, or a carrier to which a downlink signal, in which a "Semi-persistent Scheduling" has been applied, is transmitted, or a carrier to which a PHICH signal corresponding to a PUSCH signal (uplink data signal), in which a "Semi-persistent Scheduling" has been applied, is transmitted, or a carrier to which a paging signal is transmitted, or a carrier to which a DCCH (Dedicated Control Channel) signal is transmitted, or else a carrier for which measurement (Measurement) is performed. Alternatively, the Anchor Carrier may be defined by a combination of the aforementioned definitions.

The aforementioned DCCH signal may include a "Measurement Report (measurement report)", a "Handover Command (handover command signal)", or a "Handover Complete (handover complete signal)".

Furthermore, the "Anchor Carrier" may be called the "Main Carrier".

The transmission unit 12 may be configured to transmit the aforementioned TA to the mobile station UE in which CA is performed, via any carrier other than the Anchor Carrier.

Furthermore, the transmission unit 12 may be configured to specify a carrier for transmitting the aforementioned TA, by an individual control signal or a broadcast signal.

Figure 4:
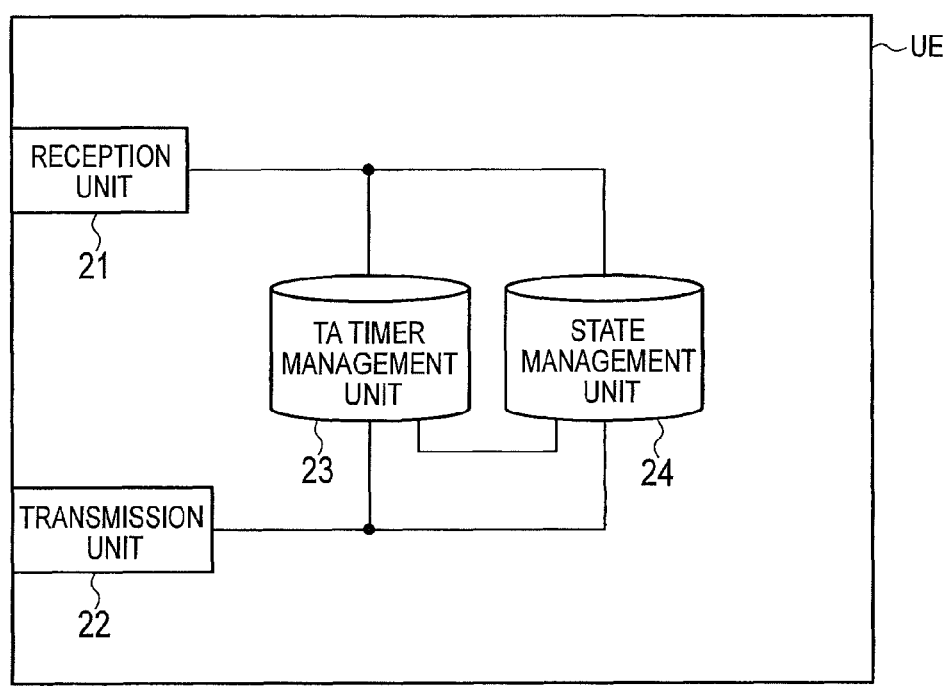
FIG. 4 is a functional block diagram of a mobile station according to the first embodiment of the present invention.

As illustrated in FIG. 4, the mobile station UE includes a reception unit 21, a transmission unit 22, a TA timer management unit 23, and a state management unit 24.

The reception unit 21 is configured to receive a "UL grant", a "Sync Request MAC CE", and a "Timing Advance MAC CE", from the radio base station eNB, via PDCCH and PDSCH.

When CA is performed in the mobile station UE, the TA timer management unit 23 is configured to manage the TA timer corresponding to each CC used in the mobile station UE.

In this case, the TA timer management unit 23 is configured to start the TA timer corresponding to each CC, when each CC is in a synchronous state.

Alternatively, the TA timer management unit 23 is configured to start the TA timer corresponding to CC upon receiving the TA ("TA Command") corresponding to each CC from the radio base station eNB.

Furthermore, the TA timer management unit 23 is configured to assign the TA that must be applied to each CC used in the mobile station UE, and manage the TA timer.

When CA is performed in the mobile station UE, the state management unit 24 is configured to manage the state (synchronous state or asynchronous state) of each CC used in the mobile station UE.

In this case, the state management unit 24 is configured to set the state of the "Component Carrier", whose TA timer has expired, to the asynchronous state.

When CA is performed in the mobile station UE, the transmission unit 22 is configured to transmit an uplink data signal or an uplink control signal to the radio base station eNB, via PUSCH or PUCCH in a plurality of "Components Carriers" having different carrier frequencies.

Even when the plurality of "Component Carriers" include a "Component Carrier" in an asynchronous state, the transmission unit 22 may be configured to enable the transmission of an uplink data signal or an uplink control signal, via PUSCH or PUCCH in a "Component Carrier" in a synchronous state included in the plurality of "Component Carriers".

Furthermore, when the "Component Carrier" designated by the identification information "Carrier Indicator Field (CIF)" specified by a "UL grant" is in a synchronous state, the transmission unit 22 may be configured to transmit an uplink data signal, via PUSCH in the "Component Carrier".

On the other hand, when the "Component Carrier" designated by the identification information "Carrier Indicator Field (CIF)" specified by a "UL grant" is in an asynchronous state, the transmission unit 22 may be configured to transmit "RACH Preamble", via PRACH (Physical Random Access Channel) in the "Component Carrier".

Furthermore, when a "Sync Request MAC CE" is received from the radio base station eNB, the transmission unit 22 may be configured to transmit an "RACH Preamble" via PRACH in all "Component Carriers" that are in an asynchronous state.

Alternatively, the transmission unit 22 may be configured to transmit an "RACH Preamble", via PRACH in the "Component Carrier" designated by the identification information "Carrier Indicator Field (CIF)" specified by the "Sync Request MAC CE" received from the radio base station eNB.

Furthermore, the transmission unit 22 is configured to adjust the transmission timing of the uplink signal in each of the plurality of "Component Carriers", based on the TA received by the reception unit 21.

The transmission unit 22 may adjust the transmission timing of the uplink signal in each of the plurality of "Component Carriers" processed by the same receiver (IFFT) within the mobile station UE, such that the transmission timing becomes the same.

That is, when the "contiguous CA" is performed in the mobile station UE, the transmission unit 22 may adjust the transmission timing of the uplink signal in each of the plurality of "Component Carriers", such that the transmission timing becomes the same.

On the other hand, the transmission unit 22 may adjust the transmission timing of the uplink signal in each of the plurality of "Component Carriers" processed by different receivers (IFFT) within the mobile station UE, such that the transmission timing is different.

That is, when a "non-Contiguous CA" is performed in the mobile station UE, the transmission unit 22 may adjust the transmission timing of the uplink signal in each of the plurality of "Component Carriers", such that the transmission timing is different.

Furthermore, the transmission unit 22 may adjust the transmission timing of the uplink signal in each group of the "Component Carrier" specified by the radio base station eNB.

According to the mobile communication system of the first embodiment of the present invention, because TA can be assigned to each CC used in a mobile station UE in which CA is performed, the reception timing of an uplink data signal in a radio base station eNB can be maintained within a constant range even when CA is performed.

Furthermore, according to the mobile communication system of the first embodiment of the present invention, because the synchronization process can be performed again for a "Component Carrier" whose TA timer has expired, accurate synchronization can be achieved between the mobile station UE and the radio base station eNB, in each "Component Carrier".

The characteristics of the present embodiment as described above may be expressed as follows.

A first characteristic of the present embodiment is summarized as a mobile communication system having a mobile station UE, in which CA is performed, configured to transmit an uplink data signal to a radio base station eNB, by using a plurality of "Component Carriers (for example, CC #1, CC #2, CC #3, CC #11, CC #12, CC #21, CC #31, and CC #32)" having different carrier frequencies, and the mobile communication system includes TA timer management units 13 and 23 configured to manage the TA timer corresponding to the plurality of "Component Carriers", and state management units 14 and 24 configured to manage the state of the plurality of "Component Carriers", and the state management units 14 and 24 are configured to set the state of a "Component Carrier", whose TA timer has expired, to an asynchronous state.

In the first characteristic of the present embodiment, even when the plurality of "Component Carriers" include a "Component Carrier" in an asynchronous state, the mobile station UE, in which CA is performed, may be configured to enable the transmission of an uplink data signal using a "Component Carrier" in a synchronous state included in the plurality of "Component Carriers".

In the first characteristic of the present embodiment, when the "Component Carrier" specified by the "UL Grant (scheduling signal)" or a synchronization request signal received from the radio base station eNB is in an asynchronous state, the mobile station UE, in which CA is performed, may be configured to transmit an "RACH Preamble (random access signal)" in the "Component Carrier".

In the first characteristic of the present embodiment, when a "Sync Request MAC CE (a predetermined signal)" is received from the radio base station eNB, the mobile station UE, in which CA is performed, may be configured to transmit an "RACH Preamble" in all "Component Carriers" that are in the asynchronous state.

A second characteristic of the present embodiment is summarized as a radio base station eNB configured to receive an uplink data signal from a mobile station UE by using a plurality of "Component Carriers" of different frequency bands, and the radio base station eNB includes a TA timer management unit 13 configured to manage the TA timer corresponding to the plurality of "Component Carriers", and a state management unit 14 configured to manage the state of the plurality of "Component Carriers", and the state management unit 14 is configured to set the state of a "Component Carrier", whose TA timer has expired, to an asynchronous state.

A third characteristic of the present embodiment is summarized as a mobile station UE configured to transmit an uplink data signal to a radio base station eNB by using a plurality of "Component Carriers" of different frequency bands, and the mobile station UE includes a TA timer management unit 23 configured to manage the TA timer corresponding to the plurality of "Component Carriers", and a state management unit 24 configured to manage the state of the plurality of "Component Carriers", and the state management unit 24 is configured to set the state of a "Component Carrier", whose TA timer has expired, to an asynchronous state.

In the third characteristic of the present embodiment, even when the plurality of "Component Carriers" include a "Component Carrier" in an asynchronous state, a transmission unit 22 configured to enable the transmission of an uplink data signal by using a "Component Carrier" in a synchronous state included in the plurality of "Component Carriers" may be included.

In the third characteristic of the present embodiment, when the "Component Carrier" specified by the "UL Grant" or a synchronization request signal received from the radio base station eNB is in an asynchronous state, a transmission unit 22 configured to transmit an "RACH Preamble" in the "Component Carrier" may be included.

In the third characteristic of the present embodiment, when a "Sync Request MAC CE" is received from the radio base station eNB, a transmission unit 22 configured to transmit an "RACH Preamble" in all "Component Carriers" that are in the asynchronous state may be included.

According to a fourth characteristic of the present embodiment, a group including one or more "Component Carriers" may be set, and a different TA timer may be set in each group.

It is noted that the operation of the above-described the radio base station eNB or the mobile station UE may be implemented by a hardware, may also be implemented by a software module executed by a processor, and may further be implemented by the combination of the both.

The software module may be arranged in a storage medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

The storage medium is connected to the processor so that the processor can write and read information into and from the storage medium. Such a storage medium may also be accumulated in the processor. The storage medium and processor may be arranged in ASIC. Such the ASIC may be arranged in the radio base station eNB or the mobile station UE. Further, such a storage medium or a processor may be arranged, as a discrete component, in the radio base station eNB or the mobile station UE.

Thus, the present invention has been explained in detail by using the above-described embodiments; however, it is obvious that for persons skilled in the art, the present invention is not limited to the embodiments explained herein. The present invention can be implemented as a corrected and modified mode without departing from the gist and the scope of the present invention defined by the claims. Therefore, the description of the specification is intended for explaining the example only and does not impose any limited meaning to the present invention.

The invention claimed is:

1. A mobile communication system having a mobile station configured to transmit an uplink signal to a radio base station by using a plurality of carriers having different carrier frequencies, comprising:
   a timer management circuitry configured to manage a Timing Advance (TA) timer corresponding to the plurality of carriers; and
   a state management circuitry configured to manage a state of each of the plurality of carriers, wherein
   the state management circuitry is configured to set the state of each of the plurality of carriers, whose TA timer has expired, to an asynchronous state, and
   the mobile station is configured to transmit a Random Access Channel (RACH) Preamble in the carrier, when the carrier specified by a Carrier Indicator Field (CIF), the CIF being transmitted via a Physical Downlink Control Channel (PDCCH) from the radio base station, is in an asynchronous state,
   wherein the mobile communication system is configured for the plurality of carriers having different carrier frequencies from the radio base station.

2. A mobile station configured to transmit an uplink signal to a radio base station by using a plurality of carriers having different carrier frequencies, comprising:
   a timer management circuitry configured to manage a Timing Advance (TA) timer corresponding to the plurality of carriers; and
   a state management circuitry configured to manage a state of each of the plurality of carriers, wherein
   the state management circuitry is configured to set the state of each of the plurality of carriers, whose TA timer has expired, to an asynchronous state, and
   a transmission circuitry configured to transmit a Random Access Channel (RACH) Preamble in the carrier, when the carrier specified by a Carrier Indicator Field (CIF), the CIF being transmitted via a Physical Downlink Control Channel (PDCCH) from the radio base station, is in an asynchronous state, is provided,
   wherein the plurality of carriers having different carrier frequencies is from the radio base station.

* * * * *